Dec. 20, 1932.  K. MAYBACH  1,891,678
CHANGE SPEED GEAR
Filed Aug. 29, 1931  2 Sheets-Sheet 1
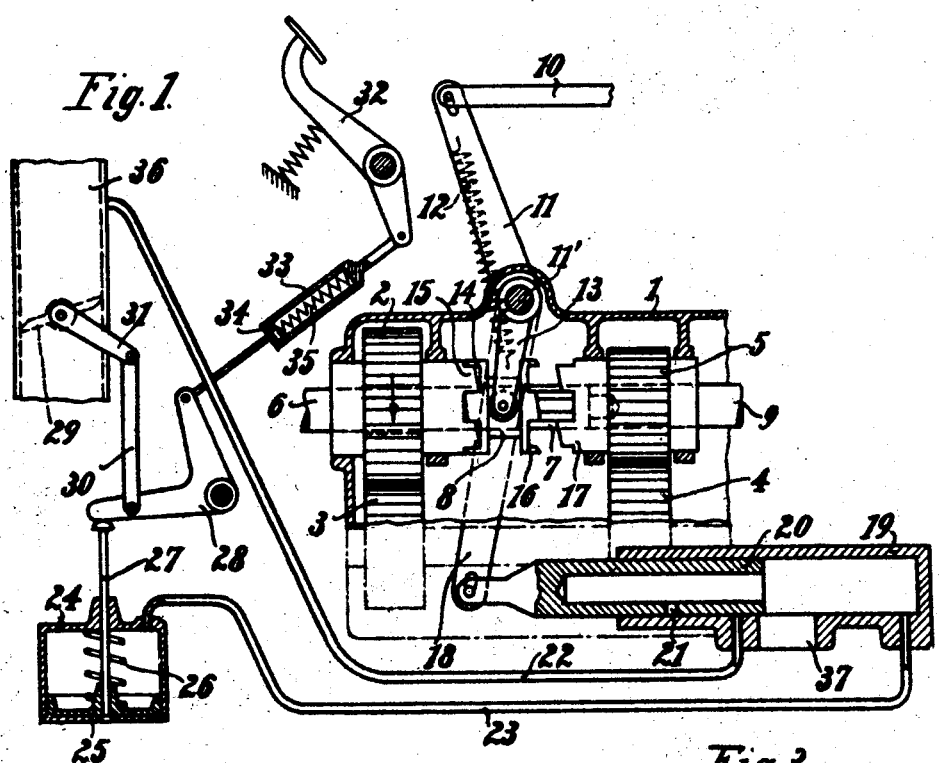
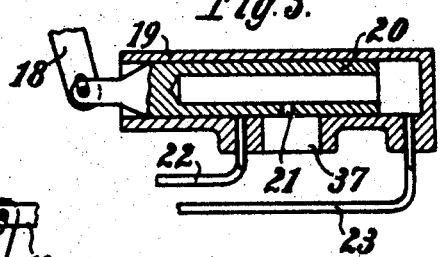
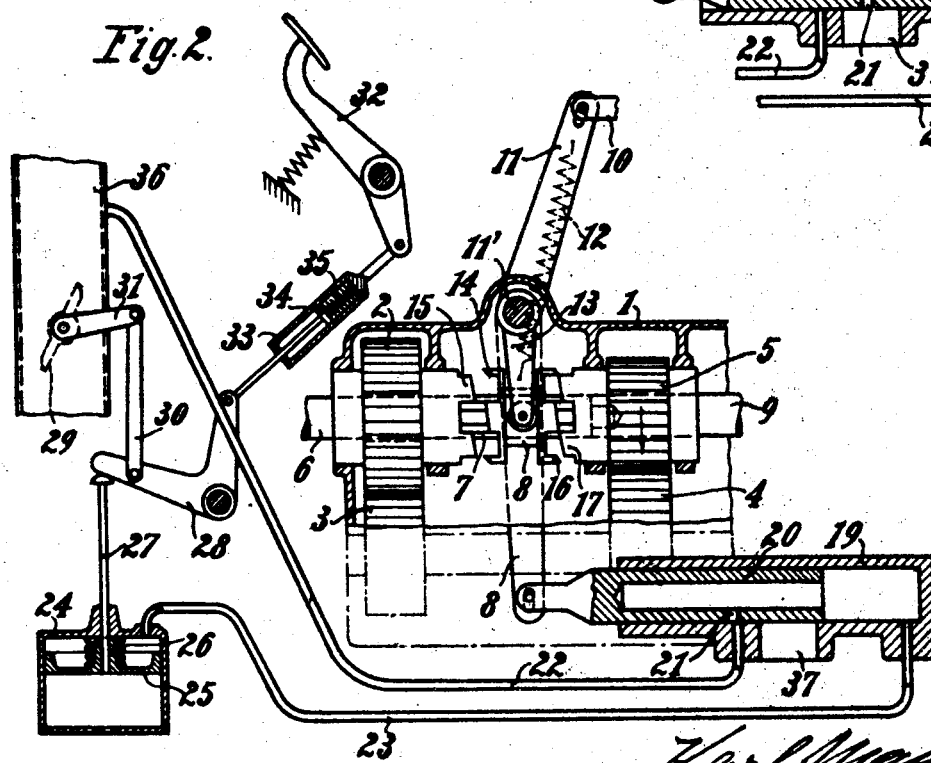
Inventor:
Karl Maybach Dec. 20, 1932.  K. MAYBACH  1,891,678
CHANGE SPEED GEAR
Filed Aug. 29, 1931   2 Sheets-Sheet 2
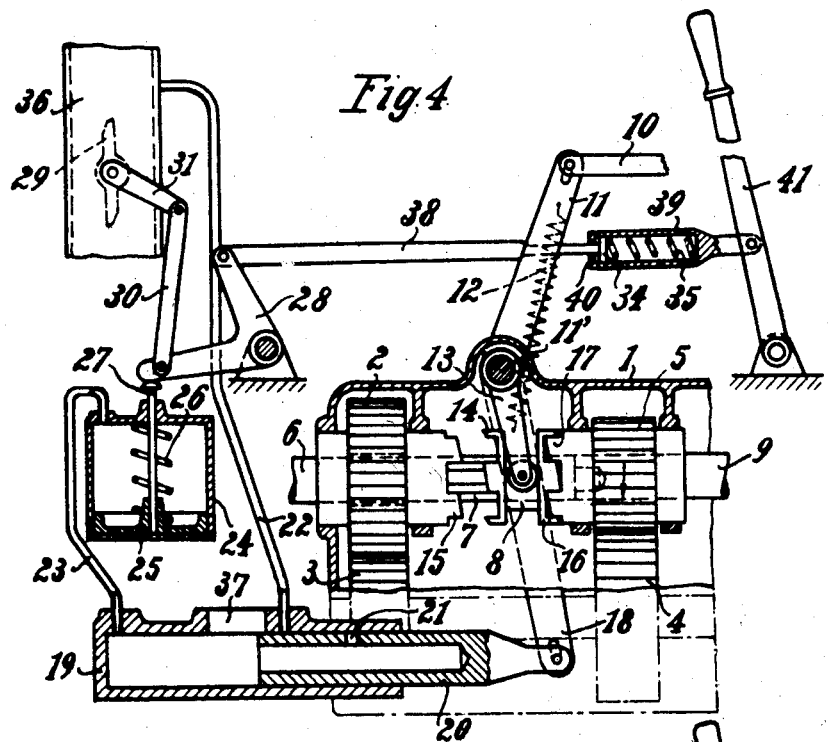
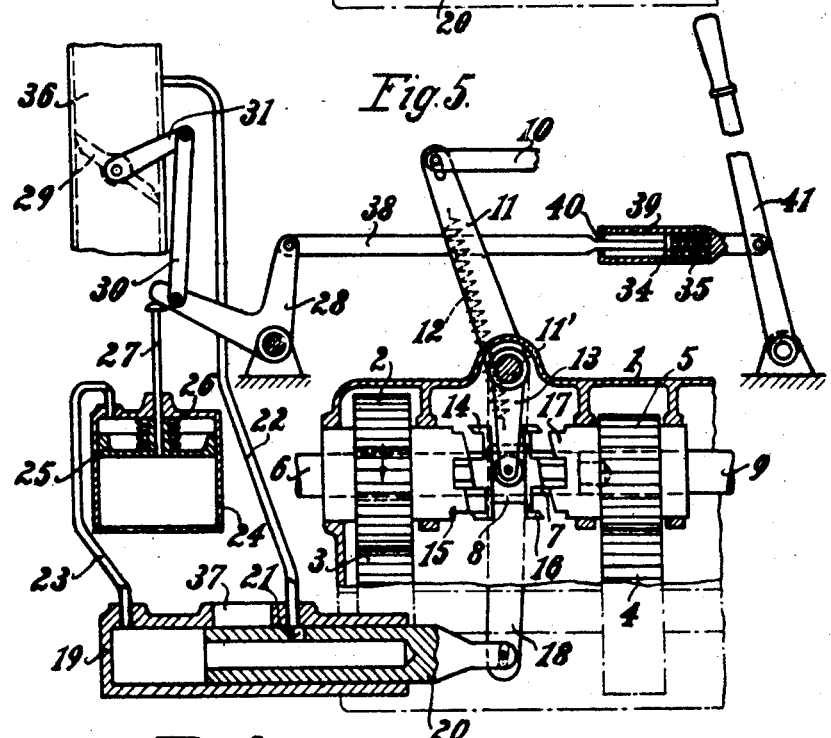
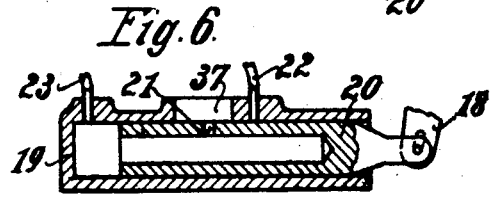
Inventor:
Karl Maybach Patented Dec. 20, 1932

1,891,678

UNITED STATES PATENT OFFICE

KARL MAYBACH, OF FRIEDRICHSHAFEN, GERMANY, ASSIGNOR TO MAYBACH-MOTORENBAU G. M. B. H., OF FRIEDRICHSHAFEN, GERMANY

CHANGE SPEED GEAR

Application filed August 29, 1931, Serial No. 560,175, and in Germany September 8, 1930.

My invention relates to change speed gears and has special reference to gears of this kind in which there are two pairs of constantly meshing gears between which two claw couplings are inserted the teeth of which are provided with so inclined front faces that the corresponding coupling halves when approaching each other do not engage but rattle past each other so long until the originally faster rotating half becomes the slower rotating one or vice versa. Gears of this kind are provided with an operating device which makes certain that alternately one or the other of the two claw couplings is in operation, an intermediate idling position being prevented by this device.

Such change speed gears may be only two-speed gears, as for example additional over-speed gears, or the two gear pairs may be combined with other gears, or several two-speed gears may be combined so as to form four, six or more speed gears.

When changing in speed by means of the special operating device, which means disconnecting one of the two claw couplings and bringing into contact the two halves of the other claw coupling, it is not necessary to declutch the main friction clutch which generally is situated between the motor and the change speed gear of automobile.

Change speed gears of this kind are well-known and described in detail in my U. S. Patent Re. 17,707.

The change in speed in such change speed gears is perfected by the driver setting the lever, thereby tensioning a spring, by then taking the gas off the motor and by giving gas again.

Generally this simple operation works alright, but under certain conditions there may arise difficulties. For example when going down a hill and changing from the faster speed to the slower speed. After the first coupling was declutched by turning the gas off, the car is rolling on, even faster than when running on a level, and therefore it is necessary that the driver then again should give gas more than ordinarily, to cause the coupling half which is in driving connection with the motor to gain in speed of rotation and to overrun the corresponding half. But because of the car going down hill the driver is likely not to do so and consequently there is no force transmitting connection between the motor and the wheels of the automobile, the two coupling halves intended to come into engagement rattling past each other. Therefore it is impossible, for instance, to use the idling motor for braking purposes.

On the other hand when changing from the slower to the faster speed the driver after having taken the gas off the motor has to wait a short time until the claw coupling half which is in driving connection with the motor has slowed down enough so that the other half which is in driving connection with the wheels of the automobile overruns the first half. It is possible that the driver thinking that he has waited long enough gives gas again before the two coupling halves have come to final engagement. The motor then begins to rotate more rapidly, and after the driver has found out that the claw coupling intended to come into engagement is not in operation it becomes necessary for him to slow the motor down again thus increasing the time necessary for this speed change.

All these drawbacks are avoided according to my invention by providing means for influencing the carburetor or the throttle of the motor. When changing from the faster to the slower speed such means serve for opening the carburetor or throttle during the period the two claw coupling halves intended to come to engagement rattle past each other. And when changing from the slower to the faster speed such means cause the carburetor or throttle to be closed during the period of the respective two claw coupling halves rattle past each other.

Such means may be constructed from levers, compression members and tension members; but I prefer to use a pressure fluid for this purpose, as for example vacuum. Consequently I provide a vacuum control member working in dependency of the respective claw coupling halves, the vacuum serving for setting the carburetor or the throttle.

All this will be understood best when having reference to the drawings which represent two examples embodying my invention. Figs. 1, 2 and 3 show the example in which the invention is applied for the purpose of opening the throttle, whereas Figs. 4, 5 and 6 give the other example in which the invention is applied for closing the throttle.

All of the figures are mere diagrams. Figs. 1, 2, 4 and 5 represent longitudinal sections through a portion of a gear case provided with the auxiliary device; Figs. 3 and 6 are sections through the vacuum control member of Figs. 1, 2 or 4, 5, respectively, but showing another position thereof.

In a casing 1 gears 2, 3, 4 and 5 are journaled, gear 2 loosely surrounding incoming shaft 6, gears 3 and 4 being rigidly connected to a transmission shaft (shown in dotted lines), and gear 5 being fixed to outgoing shaft 9. Sleeve 8 is splined to shaft 6 and adapted to cause driving connection between this shaft and gear 2 (Fig. 1) or between shaft 6 and gear 5 and shaft 9. Lever 11 journaled at 11' and adapted to be operated by means of rod 10 serves for tensioning spring 12 the other end of which is fastened to lever 13. This lever serves for moving sleeve 8 longitudinally of shaft 6.

In Fig. 1 teeth 14 of sleeve 8 are in engagement with teeth 15 of gear 2; consequently shaft 6 drives shaft 9 over gears 2, 3, 4 and 5 at an increased speed of rotation, because of the gear ratios chosen. When moving sleeve 8 to the right by pulling rod 10 and taking the gas off, the motor teeth 16 and 17 come into touch but do not engage so long as gear 5 rotates faster than sleeve 8, because of the inclination of the teeth.

Lever 18 which is in rigid connection with lever 13 acts on control member 20 sliding within cylinder 19. There is a pipe line 22 connecting from cylinder 19 to the intake 36 of the motor. This intake is used as a source of vacuum, and when aperture 21 of member 20 is situated opposite the end of pipe line 22 vacuum is created in pipe line 23 and in cylinder 24. Consequently piston 25 together with piston rod 27 is moved upwardly against the pressure of spring 26. Rod 27 pushes against crank lever 28 and by means of rods 30 and 31 works on the throttle 29.

In the example of Figs. 1 and 2 the throttle is opened until the teeth 16 and 17 have come to final engagement. When this has happened control member 20 moves further to the right and comes to the position represented in Fig. 3 in which the vacuum connection between pipe lines 22 and 23 is again interrupted so that piston 25 under the pressure of spring 26 moves back to its original position as shown in Fig. 1. Also crank lever 28 under the pressure of spring 35 which is inserted between lever 28 and foot lever 32 returns to its first position so that throttle 29 closes again.

In the example represented in Figs. 4, 5 and 6 the same arrangement as described with regard to Figs. 1, 2 and 3 serves for closing the throttle 29 during the period of the teeth 14 and 15 rattling past each other, that is when changing from direct speed (position Fig. 4) to over-speed (position Fig. 5). In this case Fig. 4 corresponds to Fig. 1, Fig. 5 to Fig. 2 and Fig. 6 to Fig. 3. In the second example there is no foot lever for operating the throttle but a hand lever 41 which acts on crank lever 28 by means of rod 38 into which also a one way spring 35 is inserted.

I do not want to be limited to the details described or shown in the drawings as many variations will occur to those skilled in the art.

What I claim is:

1. In a change speed gear comprising two pairs of constantly meshing gears and a pair of alternately operating claw couplings inserted between said pairs, the teeth of said claw couplings being provided with so inclined front faces that the halves of each of said couplings on approaching do not engage but rattle past each other until the originally faster half becomes the slower one and vice versa; means for tensioning either of said claw couplings toward engagement; an auxiliary device working in dependency of said claw couplings but not of said tensioning means and adapted to influence the opening of the intake of the motor associated with said change speed gear during the period of said claw coupling halves rattling past each other.

2. In a change speed gear comprising two pairs of constantly meshing gears and a pair of alternately operating claw couplings inserted between said pairs, the teeth of said claw couplings being provided with so inclined front faces that the halves of each of said couplings on approaching do not engage but rattle past each other until the originally faster half becomes the slower one and vice versa; means for tensioning either of said claw couplings toward engagement; an auxiliary device working in dependency of said claw couplings but not of said tensioning means and adapted to open the throttle of the intake of the motor associated with said change speed gear during the period of said claw coupling halves rattling past each other when changing from the faster speed to the slower speed.

3. In a change speed gear comprising two pairs of constantly meshing gears and a pair of alternately operating claw couplings inserted between said pairs, the teeth of said claw couplings being provided with so inclined front faces that the halves of each of said couplings on approaching do not engage but rattle past each other until the originally faster half becomes the slower one and vice versa; means for tensioning either of said claw couplings towards engagement; an auxiliary device working in dependency of said claw couplings but not of said tensioning means and adapted to close the throttle of the intake of the motor associated with said change speed gear during the period of said claw coupling halves rattling past each other when changing from the slower to the faster speed.

KARL MAYBACH.